Patented Oct. 6, 1953

2,654,777

UNITED STATES PATENT OFFICE 2,654,777

EXTRACTION OF SULFURIC ACID SLUDGE

Norman E. Lemmon, Hammond, and Frederick W. Schuessler, Valparaiso, Ind., and David W. Bransky, Chicago, Ill., assignors to Standard Oil Company, Chicago, Ill., a corporation of Indiana No Drawing. Application December 28, 1949, Serial No. 135,546

11 Claims. (Cl. 260—504)

This invention relates to improvements in recovery of petroleum sulfonic acids from acid sludge, and more particularly relates to recovery of detergent-type sulfonic acids and preferentially oil-soluble sulfonic acids from unhydrolyzed acid sludges resulting from the treatment of viscous hydrocarbon oil with strong sulfuric acid.

In the refining of hydrocarbon oils, such as viscous petroleum oils, with sulfuric acid, such as concentrated or fuming sulfuric acid, mixtures of sulfonic acids are produced. These sulfonic acids vary over a wide range of degree of water solubility. Certain of these sulfonic acids which are reddish brown in color and generally referred to as mahogany acids are preferentially oil-soluble. The bulk of the preferentially oil-soluble mahogany acids are found in the acid-treated oil after removal of the acid sludge. Another class of sulfonic acids, generally referred to as green acids because of their greenish color are found in the acid sludge; these so-called green acids are preferentially water-soluble. The green acids as a group are in fact mixtures of very water-soluble sulfonic acids known as black acids, intermediate detergent-type sulfonic acids and preferentially oil-soluble sulfonic acids, generally referred to as brown acids. The so-called black acids are more water-soluble than the intermediate detergent-type sulfonic acids, while the so-called brown acids are less oil-soluble than are the mahogany acids. The relative water and/or oil solubilities of the various sulfonic acids depend in part, at least, upon the nature of the petroleum oil fraction from which they are derived. To illustrate, the sulfonic acids in the acid sludge resulting from the treatment of light petroleum oil fractions, such as naphthas, gasolines, and gas oils are of lower molecular weight and of higher water solubility than are the sulfonic acids produced from the sulfuric acid treatment of viscous petroleum oils, namely those having a Saybolt Universal viscosity at 100° F. of about 60 seconds or more.

In the usual process of refining a viscous petroleum oil the oil is treated with a strong sulfuric acid, generally fuming sulfuric acid, and the acid sludge which is formed is separated from the acid-treated oil. From the acid-treated oil there are recovered the preferentially oil-soluble sulfonic acids or the so-called mahogany acids. In the acid sludge there are found the black acids, the intermediate detergent-type sulfonic acids, and the preferentially oil-soluble brown acids and some oil. Heretofore, the group of sulfonic acids referred to as green acids were recovered from the acid sludge by adding water to the sludge to dilute the sulfuric acid therein to a concentration of about 20% to 30%, at which concentration the green acids separated to form the supernatant layer, or the green acids were extracted from the sludge using water-soluble solvents or with mixtures of organic solvents of water. The extract so recovered from the acid sludge contained substantial amounts of black acids, which decreased the detergency value of the intermediate detergent-type sulfonic acids.

It is an object of the present invention to provide a method of recovering the intermediate detergent-type sulfonic acids and preferentially oil-soluble sulfonic acids from unhydrolyzed acid sludges resulting from the treatment of viscous hydrocarbon oils with concentrated and/or fuming sulfuric acid. Another object of the invention is to provide a method of selectively extracting the intermediate detergent-type sulfonic acids and preferentially oil-soluble sulfonic acids from unhydrolyzed acid sludges resulting from the treatment of viscous petroleum oils with strong sulfuric acid. Other objects and advantages of the present invention will become apparent from the following description thereof.

In accordance with the present invention the intermediate detergent-type sulfonic acids and the preferentially oil-soluble sulfonic acids found in the acid sludges resulting from the treatment of viscous hydrocarbon oils with strong sulfuric acid can be selectively recovered from unhydrolyzed acid sludge by extraction with a solvent consisting of a mixture of from about 1% to about 20%, preferably from about 5% to 10% by volume of an aliphatic alcohol containing not more than about 5 carbon atoms, and from about 80% to about 99%, and preferably from about 90% to about 95% by volume of an aromatic hydrocarbon. Examples of suitable aromatic hydrocarbon solvents are benzene, commercial benzol, toluenes, xylenes, naphthalenes, alkylated benzenes, alkylated naphthalenes, etc. A suitable aromatic solvent is a coal tar fraction commonly referred to as "solvent naphtha" having a boiling range of from about 266° F. to about 338° F., and comprised essentially of toluene, xylene and mesitylene.

Another suitable aromatic solvent is the aromatic fraction obtained from the fractionation of hydroformed naphtha boiling between about 375° F. to 750° F., comprising primarily mono- and polymethylated benzenes, naphthalenes, monomethyl naphthalenes and dimethyl naphthalenes, and known in the art as hydroformer bottoms or hydroformer polymers. A process by which the hydroformer polymers can be obtained is described in U. S. Patent No. 2,320,147. Briefly, the process comprises treating virgin or cracked naphtha or mixtures thereof with a solid, porous, hydroforming catalyst, such as an oxide of a metal of group II to IV of the periodic system, such as an oxide of chromium or molybdenum suitably supported on alumina or magnesia. The conversion is suitably carried out at a temperature at 850° F. to 1050° F., and if desired, in the presence of hydrogen. The hydroformer products are fractionated by conducting overhead a catalytically reformed gasoline of suitable end point and recovering the higher boiling materials as bottoms which boil from about 375° F. to about 750° F., and have gravities of from about 10° A. P. I. to about 18° A. P. I.

Another source of mixed aromatic hydrocarbons suitable for use in the present invention is a light catalytic cycle stock obtained from a powdered or fluid-type catalytic hydrocarbon cracking operation in which gas oil or heavier hydrocarbons, such as reduced crude, are cracked at a temperature of about 800° F. to 1050° F., at a pressure of about atmosphere to 50 pounds per square inch in the presence of suitable fluidized or powdered catalysts, such as for example, silica-alumina, silica-magnesia and other well-known cracking catalysts. A method of conducting fluidized catalytic cracking operation is described in U. S. 2,341,193 issued to Fred W. Scheineman February 8, 1944. The fraction suitable for use in the present invention is a heavier-than-gasoline fraction usually recycled to cracking. These fractions, depending upon their boiling range, are commonly referred to as light cycle stock, heavy cycle stock and recycle resid. The catalytic light cycle stock particularly well suited for this invention is a fraction having an aromatic content of at least about 40-50%, and a distillation range between about 425° F. and about 560° F. A typical analysis of a suitable light catalytic cycle stock shows the material to be composed substantially of about 10% normal $C_{12}$ to $C_{20}$ paraffins, about 45% of other paraffins and naphthenes, about 5% mononuclear aromatics, which are mainly mono- to hexa- alkylated benzenes, and about 40% polynuclear aromatics which are mainly alkyl naphthalenes, largely methylated naphthalenes. A typical light catalytic cycle stock will give the following A. S. T. M. distillation:

|  | °F. |
|---|---|
| Initial boiling point | 430 |
| 10% over | 448 |
| 50% over | 478 |
| 90% over | 518 |
| Maximum boiling point | 552 |

While we prefer to use a light cycle stock from a catalytic cracking operation of the type above described, hydrocarbon fractions from other catalytic hydrocarbon conversion processes or thermal hydrocarbon conversion processes are suitable, provided they have a sufficiently high aromatic content, at least 40-50 percent, and have suitable distillation characteristics, i. e., boiling above about 220° F.

In place of using the whole catalytic cycle stock we may extract the aromatic components from the cycle stock and use the aromatic extract. The aromatics may be extracted with the usual and known solvents, such as for example, liquid hydrogen fluoride, nitromethane, liquid sulfur dioxide, etc.

Examples of suitable alcohols which can be used in admixture with the aromatic hydrocarbon solvent are methyl alcohol, ethyl alcohol, propyl alcohol, isopropyl alcohol, butyl alcohol, amyl alcohol. In general, the optimum amount of the alcohol used in combination with the aromatic solvent will depend upon the type of alcohol employed. For example, when using methyl or ethyl alcohol in admixture with the aromatic solvent, such as benzene, from about 1% to about 7% of the alcohol will be effective; whereas, when using isopropyl alcohol, from about 5% to about 10% can be used with the aromatic solvents. When using higher alcohols, such as for example, butyl alcohol or amyl alcohol, from about 9% to about 20% by volume of the alcohol will be used in admixture with the aromatic hydrocarbon solvent.

In extracting the acid sludge with the mixture of alcohol and aromatic hydrocarbon solvents, the ratio of the mixed solvent to the volume of unhydrolyzed sludge to be extracted can vary from about 0.5:1 to 5:1, although we prefer to use ratios of from about 1:1 to 3.5:1. The temperature employed in extracting acid sludge can vary from about 50° to 150° F., and preferably from about 75° F. to about 100° F., using suitable means for intimately contacting the unhydrolyzed acid sludge with the solvent.

The present invention is applicable to the extraction of the detergent-type sulfonic acids and preferentially oil-soluble sulfonic acids from acid sludges resulting from the sulfuric acid treatment of viscous hydrocarbon oils having a Saybolt Universal viscosity at 100° F. of at least about 60 seconds, usually from about 80 seconds to about 900 seconds, or more. Usually, such sulfonic acids are extracted from acid sludges obtained in the manufacture of highly refined petroleum oils of the type of insulating oils, turbine oils, technical white oils, medicinal mineral oils, etc., in which the oils are treated successively with a number of portions of concentrated or fuming sulfuric acid, and the sludge separated after each acid dump. The quantity of sulfuric acid used can vary from about 0.5 to about 9 pounds of strong sulfuric acid per gallon of oil being treated. The acid sludge so obtained contains a variety of sulfur-containing compounds, including sulfonic acids and unreacted sulfuric acid. For the extraction of the sulfonic acids from the acid sludge by the present invention the unreacted sulfuric acid in such sludges should be of such concentration that it is incapable of reacting with the aromatic solvent. For example, the concentration of sulfuric acid in the acid sludge should be insufficient to sulfonate the aromatic solvent employed, for example, benzene. Accordingly, the sulfuric acid in the acid sludge should be maintained at a strength less than about 90%. When the sulfuric acid in the acid sludge is above about 90% strength, the concentration thereof can conveniently be reduced to a level below about 90% by the addition of weaker sulfuric acid, for example, by the addition of 80% sulfuric acid. It is to be understood, of course, that instead of reducing the concentration of the sulfuric acid in the acid sludge to a level below about 90%, the extraction can be carried out by employing in the solvent mixture aromatic hydrocarbons and alcohols, which are non-reactive with the sulfuric acid.

In accordance with the present invention an unhydrolyzed acid sludge resulting from the treatment of a viscous hydrocarbon oil with fuming sulfuric acid or concentrated sulfuric acid is thoroughly mixed in the proper predetermined ratio with the mixed alcohol-aromatic hydrocarbon solvent. After suitable contacting, the mixture of sludge and solvent is settled to permit stratification and the solvent layer separated from the acid sludge layer. The former contains the intermediate detergent-type sulfonic acids and any preferentially oil-soluble sulfonic acids and oil which may have been present in the unhydrolyzed acid sludge; while the latter contains the preferentially water-soluble black acids and unreacted sulfuric acid. To avoid decomposition of the sulfonic acids, the solvent-extract of sulfonic acids should first be neutralized to convert the sulfonic acids to the corresponding sulfonate, prior to the removal of the solvent by heating. Preferably, the neutralized solvent solution should contain from 5% to 10% excess base.

The sulfonic acids extracted from the acid sludge with the mixed solvents can be converted to the corresponding sulfonates by neutralization with a suitable neutralizing agent and freed of the solvent to obtain a mixture of sulfonates. Suitable neutralizing agents are the oxides, carbonates or hydroxides of the alkali metals or the alkaline earth metals or mixtures thereof. For example, the oxides, carbonates, or hydroxides of sodium, potassium, lithium, calcium, barium, strontium, etc. The neutralization can also be accomplished with ammonia and other basic nitrogenous compounds, such as toluidine amines, etc. It is to be understood that, if desired, the neutralization can also be accomplished by the addition of an oxide, hydroxide, or carbonate of a heavy polyvalent metal, such as lead, zinc, copper, manganese, etc.

When desired, the intermediate detergent-type sulfonic acids can be selectively separated from the preferentially oil-soluble sulfonic acids by neutralizing the mixed solvent extract, removing the solvent from the neutralized product, if desired, and subsequently extracting the sulfonates with an aliphatic hydrocarbon oil, preferably a distillate having a maximum A. S. T. M. distillation temperature of not more than about 500° F., and preferably having a distillation range of from about 150° F. to about 350° F., and containing not more than about 5% aromatic hydrocarbons. Suitable aliphatic hydrocarbon solvents are light petroleum oils and petroleum naphthas, particularly virgin naphthas of the desired distillation characteristics. The hydrocarbon solvent selectively extracts the preferentially oil-soluble sulfonates from the intermediate detergent-type sulfonates. As an alternative method, the unhydrolyzed acid sludges can first be extracted with the hydrocarbon solvent to remove the preferentially oil-soluble sulfonic acids and oil, and the acid sludge then extracted with the mixed aromatic-alcohol solvent to remove the intermediate detergent-type sulfonic acids from the acid sludge. Each of the extracts can then be neutralized and freed of the respective solvents. A further alternative method of effecting separation of the detergent-type sulfonic acids from the preferentially oil-soluble sulfonic acids is adding an aliphatic hydrocarbon solvent, of the type above described, to the solution of extracted sulfonic acids in the mixed alcohol-aromatic hydrocarbon solvent whereby the detergent-type sulfonic acids are precipitated from the solution.

The recovery of intermediate detergent-type sulfonic acids and preferentially oil-soluble sulfonic acids by extracting with a mixed alcohol-aromatic hydrocarbon solvent is illustrated by the following examples:

Example I

The acid sludge resulting from the treatment of a distillate oil having a Saybolt Universal viscosity at 100° F. of 125 seconds with 2 to 2½ pounds of fuming sulfuric acid per gallon of oil was extracted with a mixed solvent consisting of 5% isopropyl alcohol and 95% benzene by agitating the mixture at a temperature of about 80° F. The mixture was then allowed to stratify, the solvent layer recovered. The recovered detergent-type sulfonic acids and preferentially oil-soluble sulfonic acids amounted to 40%.

Example II

A mineral oil distillate having a Saybolt Universal viscosity at 100° F. of 95–100 seconds was treated with three pounds of fuming sulfuric acid per gallon of distillate in one-half pound dumps, and the acid sludge withdrawn after each dump of acid. The sludge formed by the last acid dump was divided into three portions, and each portion was extracted with two volumes of mixed solvent per volume of sludge. The following table gives the solvent mixtures used and the number of grams of sulfonic acids extracted from 100 grams of the acid sludge:

| Solvent Mixture | Grams of Sulfonic Acids Extracted From 100 Grams of Sludge |
| --- | --- |
| 93% Benzol<br>7% Iso-propyl Alcohol | 41.0 |
| 93% Hydroformer bottoms<br>7% Iso-Propyl Alcohol | 44.0 |
| 88% Light Catalytic Cycle Stock<br>12% Tertiary Amyl Alcohol | 36.0 |

The selective separation of the detergent-type sulfonic acids and the preferentially oil-soluble sulfonic acids is illustrated by the following example:

Example III

An acid sludge of the type used in Example I above, was first successively extracted with petroleum naphtha and benzene and the sulfonic acids, including some preferentially oil-soluble brown sulfonic acids, extracted in each case recovered. The remaining portion of the extracted acid sludge was then further extracted with a mixed solvent consisting of 5% isopropyl alcohol and 95% benzene. The recovered raffinate consisting essentially of detergent-type sulfonic acids and preferentially oil-soluble sulfonic acids of brown acid type amounted to 13.7% of the acid sludge. The solution of the mixed sulfonic acids in the mixture of isopropyl alcohol and benzene was then mixed with 2 volumes of petroleum naphtha, whereby a precipitate of intermediate detergent-type sulfonic acid, amounting to 9.1% of the total acid sludge was obtained. The preferentially oil-soluble sulfonic acids remaining in solution amounted to 4.6% of the total acid sludge.

The term "intermediate detergent-type sulfonic acids" as used herein and in the appended claims, includes those sulfonic acids recovered from unhydrolyzed sulfuric acid sludges which are water-soluble to the exclusion of any substantial quantities of preferentially water-soluble black acids. The term "strong sulfuric acid" as used herein and in the appended claims, includes concentrated sulfuric acid of at least about 95% strength and fuming sulfuric acids. The term "viscous hydrocarbon oil" as used herein and in the appended claims means a hydrocarbon oil having a Saybolt Universal viscosity at 100° F. of at least about 60 seconds.

While we have described our invention by way of preferred embodiments thereof, other modifications may be made without departing from the scope and spirit of the invention. We, therefore, include within the scope of our invention such modifications as come within the spirit of the appended claims.

We claim:

1. The method of recovering intermediate detergent-type sulfonic acids and preferentially oil-soluble sulfonic acids from unhydrolyzed acid sludge containing preferentially water-soluble black acids, intermediate detergent-type sulfonic acids, preferentially oil-soluble sulfonic acids, and unreacted sulfuric acid, resulting from the treatment of viscous hydrocarbon oils with strong sulfuric acid, comprising initially extracting said unhydrolyzed acid sludge with a solvent mixture consisting essentially of from about 1% to about 20%, by volume, of an aliphatic alcohol containing not more than about 5 carbon atoms and from about 80% to about 99%, by volume, of an aromatic hydrocarbon solvent, separating the mixed solvent, containing dissolved therein the intermediate detergent-type sulfonic acid and preferentially oil-soluble sulfonic acids, from the acid sludge.

2. The method of claim 1 in which the aromatic hydrocarbon solvent is benzene.

3. The method of claim 1 in which the aromatic hydrocarbon solvent is an aromatic fraction boiling from about 375° F. to 750° F., comprising primarily mono- and polymethylated benzenes, naphthalenes and mono- and polymethylated naphthalenes, produced by the catalytic conversion of aliphatic hydrocarbons.

4. The method of claim 1 in which the aromatic hydrocarbon solvent is a catalytic cycle stock fraction having a distillation range of between about 425° F. and about 560° F., and having an aromatic content of at least about 40%.

5. The method of claim 1 in which the aliphatic alcohol is isopropyl alcohol.

6. The method of claim 1 in which the aliphatic alcohol is a butyl alcohol.

7. The method of claim 1 in which the aliphatic alcohol is an amyl alcohol.

8. The method of recovering intermediate detergent-type sulfonic acids and preferentially oil-soluble sulfonic acids from unhydrolyzed acid sludge containing preferentially water-soluble black acids, intermediate detergent-type sulfonic acids, preferentially oil-soluble sulfonic acids and unreacted sulfuric acid, resulting from the treatment of viscous hydrocarbon oils with strong sulfuric acid, comprising adjusting the concentration of the sulfuric acid in the unhydrolyzed acid sludge to a concentration below about 90% strength, and initially extracting the adjusted acid sludge with a mixed solvent consisting essentially of from about 5% to about 10% by volume of an aliphatic alcohol, containing not more than about 5 carbon atoms, and from about 90% to about 95% by volume of an aromatic hydrocarbon solvent, separating the mixed solvent, containing dissolved therein the intermediate detergent-type sulfonic acids and the preferentially oil-soluble sulfonic acids, from the acid sludge.

9. The method of recovering intermediate detergent-type sulfonic acids from unhydrolyzed acid sludge containing preferentially water-soluble black acids, intermediate detergent-type sulfonic acids, preferentially oil-soluble sulfonic acids and unreacted sulfuric acid resulting from the treatment of viscous hydrocarbons, with strong sulfuric acid, comprising maintaining the sulfuric acid in the acid sludge at a concentration below about 90% strength, initially extracting the acid sludge with a mixed solvent consisting essentially of from about 1% to about 20% of an aliphatic alcohol having not more than about 5 carbon atoms and from about 80% to about 99% of an aromatic hydrocarbon solvent, separating the mixed solvent, containing intermediate detergent-type sulfonic acids and preferentially oil-soluble sulfonic acids, from the acid sludge, and adding an aliphatic hydrocarbon solvent to the mixed-solvent extract mixture to precipitate therefrom the detergent-type sulfonic acids.

10. The method of recovering intermediate detergent-type sulfonic acids and preferentially oil-soluble sulfonic acids from unhydrolyzed acid sludge containing preferentially water-soluble black acids, intermediate detergent-type sulfonic acids and preferentially oil-soluble sulfonic acids resulting from the treatment of viscous hydrocarbon oils with strong sulfuric acid, comprising initially extracting the acid sludge with a mixed solvent consisting essentially of from about 1% to about 20%, by volume, of an aliphatic alcohol containing not more than about 5 carbon atoms and from about 80% to about 99%, by volume, of an aromatic hydrocarbon solvent, separating the mixed solvent, containing dissolved therein the intermediate detergent-type sulfonic acids and the preferentially oil-soluble sulfonic acids, from the insoluble portion of the acid sludge, neutralizing the extracted sulfonic acids, and extracting the resultant preferentially oil-soluble sulfonates with an aliphatic hydrocarbon solvent.

11. The method of recovering intermediate detergent-type sulfonates, and preferentially oil-soluble sulfonates from unhydrolyzed acid sludge resulting from the treatment of viscous hydrocarbon oils with strong sulfuric acid, comprising initially extracting said unhydrolyzed acid sludge with a solvent mixture consisting essentially of from about 1% to about 20%, by volume, of an aliphatic alcohol containing not more than about 5 carbon atoms, and from about 80% to about 99%, by volume, of an aromatic hydrocarbon solvent, separating the solvent mixture containing the intermediate detergent-type sulfonic acids, and the preferentially oil-soluble sulfonic acids, neutralizing the sulfonic acids in the solvent mixture, and recovering the solvent from the resultant sulfonates.

NORMAN E. LEMMON.
FREDERICK W. SCHUESSLER.
DAVID W. BRANSKY.

References Cited in the file of this patent

UNITED STATES PATENTS

| Number | Name | Date |
|---|---|---|
| 525,784 | Helmers | Sept. 11, 1894 |
| 1,409,590 | Salathe et al. | Mar. 14, 1922 |
| 1,474,933 | Humphreys et al. | Nov. 20, 1923 |
| 1,568,261 | Bennet et al. | Jan. 5, 1926 |
| 1,947,861 | Liberthson | Feb. 20, 1934 |
| 2,223,194 | Thompson | Nov. 26, 1940 |
| 2,368,452 | Dawson | Jan. 30, 1945 |
| 2,406,763 | Griesinger | Sept. 3, 1946 |
| 2,479,202 | Bransky | Aug. 16, 1949 |